3,316,222
COPOLYMERS OF ETHYLENE AND VINYL
ETHERS OF POLYOLS
Giffin D. Jones and Robert L. Zimmerman, Midland, Mich., assignors to The Dow Chemical Company, Midland, Mich., a corporation of Delaware
No Drawing. Filed Sept. 15, 1958, Ser. No. 760,837
21 Claims. (Cl. 260—80.5)

The present invention contributes to the synthetic polymer art and relates more particularly to copolymers that are comprised of ethylene and the various polyol vinyl ethers, including the several mono- and polyvinyl ethers of the glycols. It is also concerned with a method of preparing such copolymers so that they are obtained in an uncrosslinked and soluble form.

It is the object of the present invention to provide new and useful copolymers of ethylene with the several vinyl ethers of various aliphatic polyols (including, in particular, glycols), which copolymers are possessed of residual unsaturation and are soluble in many aromatic solvents and, by virtue of their inherent attributes, have exceptional properties for many uses, being superior in many applications to ordinary polyethylene, of either the low density and branch-structured or more recently available essentially linear, macromolecular, high density varieties. It is a corollary object of the invention to provide a method of preparing such copolymers.

The copolymers of the present invention, which are elastomeric and flexible in nature, are comprised of ethylene polymerized with a monomeric vinyl (including polyvinyl) ether of an aliphatic polyol, particularly a glycol, so as to contain from 50 to about 99 percent by weight of combined ethylene, based on the weight of the copolymer. Advantageously, the copolymers contain from about 70 to about 90 percent by weight of combined ethylene. A third comonomer, which may consist of either a monovinyl ether or ester of a monocarboxylic aliphatic acid or monohydric aliphatic alcohol (either acid or alcohol having up to about 8 carbon atoms), or a mixture thereof, may be employed in the copolymers of the present invention to supplement or substitute for part of the glycol or other aliphatic polyol vinyl ether constituent that is copolymerized in the polymer molecule. Thus, up to about 90 mole percent, based on the quantity of the other than ethylene constituents in the copolymer, may be comprised of the supplemental third comonomer. Beneficially, at least about 5 mole percent, and advantageously between about 25 and 75 mole percent (on the indicated basis), of the supplemental vinyl ether or ester may be employed.

The elastomeric ethylene copolymers of the present invention may be obtained by the polymerization of ethylene with the vinyl ether of the polyol (or with a mixture of the glycol or other polyol vinyl ether and one or more suitable supplemental comonomers) under pressures between about 5 or 10 thousand to about 40 thousand or more pounds per square inch using suitable catalysts, such as peroxide catalysts, for the copolymerization and heat at elevated temperatures in the neighborhood of 60 to about 230° C. or so to accomplish the reaction, advantageously from about 120–135° C. Such peroxide-type catalysts as lauroyl peroxide, tert-butyl hydroperoxide, ditert-butyl peroxide, dicumyl peroxide, etc., in quantities between about 0.1 and 0.5 or so percent by weight, based on the weight of the other-than-ethylene monomer being polymerized, may be utilized with advantage for the copolymerization.

The polymerization under high pressure may be accomplished in bulk or mass, if desired, i.e., without any utilization or presence of a solvent vehicle or medium for the polymerization. This may be achieved, for example, by directly pressing the ethylene into the monomeric polyol vinyl ether to be copolymerized therewith, or into a mixture of polyol vinyl ether and supplemental vinyl ether or vinyl ester, or both. As is apparent, the ethylene supply in the reactor employed may be a fixed and a realtively static quantity. Preferably, however, there is employed a continuous dynamic feed of ethylene under pressure using arrangements which may, conveniently, involve continuous bleeding or draw-off of unreacted ethylene and other gases or vapors (including other unreacted comonomer) during the course of the reaction. This generally facilitates closer control of the copolymer composition.

Advantageously, however, the polymerization is conducted using benzene as a solvent for the reaction primarily for the monomeric constituents being combined. The polymerization may also be accomplished in equivalent aromatic solvents of the benzene series (such as tert.-butyl benzene) for the reactants, or in such other suitable solvents as tert.-butyl alcohol, or mixtures of benzene with such solvents. Any concentration of monomers (or resulting polymerized product) in the solvent may be employed. Of course, the dictates of economy and avoidance of handling inconveniently large volumes favors use of less dilute solutions of the reactants (or resulting products) in the solvent. Generally, when a solvent is employed, it is convenient for the other-than-ethylene monomeric constituents dissolved therein to be present in a concentration between about 2 and 50 or 80 percent by weight, based on the weight of the resutling solution, and depending, as is apparent, upon the particular monomers and solvents involved.

Although, as hereinafter manifest, it is desirable to stop the polymerization short of absolute completion, the use of a solvent vehicle in the polymerization mass frequently possibilitates relatively greater and more complete conversions of the reactant monomers to desired copolymerized product. In this connection, better conversions within expedient ranges are also achieved by utilization of mercaptans in the polymerization mass, such as dodecyl mercaptan and equivalent oil-soluble mercaptans, in quantities between about 0.1 and 1 weight percent, based on the weight of the other-than-ethylene monomers being polymerized.

In the practice of the present invention, it is necessary to terminate the polymerization of the comonomers short of complete conversion of the glycol or other polyol vinyl ether constituent in order to obtain a non-crosslinked and generally dissolvable product. To this end, the polymerization should be stopped so that not less than 10 percent by weight of the polyol vinyl ether, based on the original quantity of such monomer present, remains unreacted in the polymer mixture after termination of the copolymerization. Advantageously, between about 25 and 75 percent by weight of the glycol or other polyol vinyl ether should be permitted to remain in an unconverted form. Of course, despite the fact that it is generally uneconomical to do so, greater quantities of the polyol vinyl ether can be permitted to remain unreacted in the polymerization mixture during preparation of the copolymers of the present invention.

The copolymer product can be separated from unpolymerized monomer constituents in the reaction mass by vacuum distillation of the unreacted monomer or by extraction of unreacted portions of the monomer with a suitable extractant therefore, such as methanol or cold benzene.

The copolymers of the present invention as indicated, have many advantages and desirable uses. The copolymers, which are non-crosslinked and soluble in various solvents, may be employed with great benefit for the preparation of graft copolymerized or interpolymeric products wherein the ethylene copolymer is utilized or serves as a preformed "backbone" trunk or substrate for the graft copolymer product. Thus, the ethylene copolymer of the present invention may be graft copolymerized with great advantage with such alkenyl aromatic monomers as styrene, vinyl toluene, mono- and dichloro styrene and the like, to prepare useful polymeric products in which the preformed ethylene copolymer substrate reinforces, as it were, the interpolymerized alkenyl aromatic constituents of the composition. In addition, the copolymers are also excellent binding agents for various inert fillers such as carbon black, finely divided silica, calcium carbonate, hydrated calcium silicate, glass fibers, and the like. The filled compositions can be molded by compression or injection molding techniques or fabricated by being sheeted on calender rolls or in other desired ways, depending upon the applications intended for the resulting products. Certain of the copolymers of the invention can also be employed as rocket propellants having good physical properties in admixture with such oxidants as perchlorate or nitrate salts.

The copolymers of the present invention can be cured or vulcanized so as to become cross-linked when they are employed solely or in the form of filled compositions (i.e., when the copolymers are used as bonding agents). Conventional Friedel-Crafts catalysts, such as boron trifluoride, can be utilized for the curing or, if desired, such forms of high energy radiation as X-ray, gamma ray, or the like, may be employed for the purpose. Ultraviolet light or mere heat at elevated temperatures (i.e., thermal curing), can also be employed to cure the copolymers. When high energy radiation is utilized for the curing of the present compositions, the dose requirements are much less than that which is necessary for the crosslinking or curing of the conventional low density, branch structure "polythene"-type polyethylene plastics. This, as will be apparent, is of great practical importance, since high energy radiation has generally been too expensive in comparison with chemical crosslinking agents for the vulcanization of various rubbers. As herein employed, the term "vulcanization" is intended to imply the achievement and maintenance of resilience of the vulcanized or cured product over a wide temperature range.

The vinyl ethers of polyols used for the copolymers with ethylene of the present invention are, as indicated, mono- and polyvinyl ethers of various aliphatic polyols, beneficially glycols, which polyols preferably contain from 2 to about 10 carbon atoms in their structures and which may also be constituted with or without ether linkages in the aliphatic chain. In this connection, polyols containing such a quantity or proportion of hetero-oxygen in the chain as to have as many as 6 or so ether links may be utilized.

Advantageously, mono- and divinyl ethers of glycols are employed in the practice of the present invention, including such typical species as the monovinyl ether of diethylene glycol, the divinyl ether of diethylene glycol (both highly advantageous varieties), the mono- and divinyl ethers of tetraethylene glycol, as well as mono- and divinyl ethers of such glycols (or their general equivalents within the above-indicated scope) as:

HOCH₂CH₂OH
(ethylene glycol)

HOCH₂CH₂CH₂OH
(propylene glycol)

HO(CH₂)₆OH
(hexamethylene glycol)

HO(CH₂)₈OH
(octamethylene glycol)

HOCH₂C(CH₃)₂CH₂OH
(2,2-dimethyl-1,3-propanediol)

HOCH₂CH₂OCH₂CH₂OCH₂CH₂OH
(triethylene glycol)

As is apparent, vinyl ethers of polyglycols made of poymerized propylene or butylene oxide or mixtures of propylene or butylene oxide with one another or with ethylene oxide may also be employed with advantage for the copolymers of the present invention. Of course, the present copolymers can be readily prepared with mixtures of various glycol vinyl ethers polymerized in their molecules.

By way of further particularization, the divinyl ethers of glycols employed for the preparation of the present copolymers are preferably of the general structure:

$$H_2C=CHOZOHC=CH_2 \qquad (I)$$

wherein the unit —OZO— is a divalent radical from a glycol obtained by removal of the terminal hydrogens therefrom. The monovinyl ethers are preferably of the structure:

$$H_2C=CHOG \qquad (II)$$

wherein the unit —OG— is a monovalent radical from a glycol obtained by removal of a single terminal hydrogen therefrom.

In addition, if desired, such monomeric polyol vinyl ethers as the mono-, di- or trivinyl ethers of glycerine, or mixtures thereof, or analogous vinyl ethers of equivalent triols within the indicated scope may also be employed for preparation of the copolymers of the present invention.

Vinyl acetate, vinyl formate, vinyl propionate, vinyl ethyl ether, vinyl-2-chloro-ethyl ether, vinyl butyl ether, vinyl cyclohexyl ether, and the like and equivalent vinyl ethers or esters of aliphatic (including cycloaliphatic) acids or alcohols may be employed with great advantage for preparation of the present copolymers in supplemental combination in the described fashion with the polyol vinyl ethers.

In order to illustrate the invention, the following examples are given, wherein all parts and percentages (unless otherwise indicated) are to be taken on a weight basis.

*Example 1*

A solution of about 12.7 grams of the divinyl ether of diethylene glycol in 253.3 grams of benzene was placed in a 750 ml. autoclave and heated at 130–135° C. for 4½ hours under about 500 atmospheres of ethylene pressure. About 0.08 gram of ditertiary butyl peroxide was employed in the reaction mass as a catalyst. During the reaction, there was observed an uptake of about 350 atmospheres of ethylene. The autoclave was repressured whenever the ethylene pressure therein dropped beneath about 450 atmospheres. A 62.6 gram yield of copolymer was obtained by fitering the benzene solution and drying the resulting filtered material. By analysis, the copolymer was found to contain about 6.6 percent of the divinyl ether of diethylene glycol and about 93.4 percent of ethylene. It was soluble in xylene at 75° C. and had the following physical properties:

Density _____ g./cc __ 0.9295
Tensile Strength _____ p.s.i __ 1360
Ultimate Elongation _____ percent __ 360
Bending Modulus _____ 27,000

About 15 grams of the copolymer was compounded with about 15 grams of channel carbon black having an average particle diameter of about 30 millimicrons. The compounding was accomplished by milling the composition for about 10 minutes on open steel rolls. The resulting blanket was compression molded into standard test pieces having dimensions of about 0.060 x 0.5 x 3 inches at a temperature of about 150° C. In the operation, about 15 minutes was taken to heat the material to temperature after which it was maintained for about 5 minutes at 150° C. The sample was cooled to room temperature in about 6 minutes. For purposes of comparison, another sample of the same copolymer was similarly milled and molded but without any incorporation of carbon black. Based on the averages of several tests, each sample has the following properties:

TABLE I.—PROPERTIES

| Sample | Tensile strength, lbs./sq. Inch | Percent Elongation | Bending Modulus (a) |
|---|---|---|---|
| Milled and molded without carbon black | 1,260 | 280 | 28,000 |
| Milled and molded with carbon black | 2,460 | 5.8 | 148,000 | a According to A.S.T.M. Test D790-49T.

By way of still further comparison, when it was attempted to put the same amount of carbon black into branch-structured, conventional polythene-type polyethylene having a melt index of about 0.7, a very brittle composition of doubtful (or, at least, not general) utility resulted.

*Example 2*

Using a 340 milliliter bomb, a medium for emulsion polymerization was prepared according to the following recipe:

| | Grams |
|---|---|
| Water | 100 |
| Sodium bicarbonate | 0.2 |
| Sodium dioctyl sulfosuccinate ("Aerosol OT") | 1.0 |
| Tertiary butyl hydroperoxide | 0.13 |
| Divinyl ether of diethylene glycol | 30 |
| Benzene | 30 |

The reaction medium was pressured with ethylene under 15,000 pounds per square inch and shaken at 120° C. until about 4,700 pounds per square inch of ethylene had been absorbed. The latex was coagulated with calcium chloride and 7 grams of copolymer isolated.

*Example 3*

Into a pressure resistant autoclave having a capacity of about one liter there was charged a mixture of (a) about 120 grams of the divinyl ether of diethylene glycol; (b) about 240 grams of benzene as a solvent; and (c) about 0.387 gram of tertiary butyl hydroperoxide as a catalyst. The monomeric divinyl ether of diethylene glycol that was employed was a colorless liquid which boiled under atmospheric pressure at 195–197° C. and had a refractive index $n_D^{35}$ of 1.4402 and a density at 25° C. of about 0.964 gram per cubic centimeter. The charged mixture was heated in the autoclave to a temperature of about 120° C., after which ethylene gas was introduced into the autoclave and maintained therein at a pressure of about 15,000 pounds per square inch (p.s.i.) over a period of about 20 hours while maintaining the contents at the indicated elevated temperature. At the termination of this period, the reaction mass was cooled and the autoclave vented. The copolymeric reaction product was removed from the autoclave by dissolving it in benzene from which it was recovered by pouring the benzene solution into methyl alcohol, whereupon the copolymer precipitated. The precipitated copolymer was then separated from the solvent mixture and dried. There was in this way obtained about 115 grams of a copolymeric product in the form of a light colored powder. The elastomeric ethylene copolymer contained about 27.2 percent of the polymerized divinyl ether of diethylene glycol and 72.8 percent of ethylene. A solution of the copolymer in toluene containing about 0.5 percent by weight of the copolymer product had an absolute viscosity at 25° C. of about 0.72 centipoise.

A mixture of about 5 parts of the above described copolymer according to the present invention of ethylene and the divinyl ether of diethylene glycol and 95 parts of monomeric styrene was interpolymerized by heating in a closed container at a temperature of 130° C. for 12 hours followed by an additional period of 4 hours of heating at 150° C. The container and its contents were cooled and the graft copolymer composition removed. The thereby obtained graft copolymer composition was crushed to granular form and subsequently heated at 190° C. under an absolute pressure of 10 mm. Hg for a period of about 2 hours in order to remove volatile residues therefrom. After the devolatilization, the graft copolymer composition was again cooled and recomminuted to a granular form. There was thus obtained about 99 parts of graft copolymeric product.

About 98.65 parts of this graft copolymeric product was compounded with about 0.85 part of n-butyl stearate as a lubricant and 0.5 part of 2,6-ditertiary butyl-4-methyl-phenol as a stabilizer. The compounding was accomplished by milling the composition for about 10 minutes on open steel rolls maintained at 160° C. After the compounding, the graft copolymer composition was again broken and granulated.

Portions of the compounded graft copolymer product were injection molded to form standard test bars of ⅛ inch by ⅛ inch cross-section having lengths of about 3½ inches. These test bars were then employed to determine the tensile strength and elongation values of the product employing procedures similar to those described in ASTM B638–49T. The impact strength of the composition was determined on unnotched specimens with an Izod pendulum using two ⅛ inch bars side by side. Other molded test bars were used to determine the heat distortion temperature of the graft copolymer product employing the procedure described by Heirholzer and Boyer in A.S.T.M. Bulletin No. 134 of May, 1934. Based upon the averages of several samples, the graft copolymer product had the following properties:

TABLE II—PROPERTIES

| | |
|---|---|
| Tensile strength p.s.i. | 5860 |
| Elongation percent | 13.5 |
| Unnotched impact strength in.-lb. | 3.1 |
| Heat distortion temperature ° C. | 86 |

Useful shaped articles, such as receptacle boxes, kitchen utensils, and so forth are made of the graft copolymer product by fabricating it in any desired and conventional manner, as by injection or compression molding it into desired forms.

*Example 4*

In a series of four experiments, the preformed, elastomeric olefin copolymer of Example 3 was dissolved in varying proportions of monomeric vinyl toluene and the mixture heated in a closed container at 130° C. for an initial period of 12 hours followed by additional heating at 150° C. for 4 more hours in order to graft copolymerize the monomer on the preformed ethylene copolymer. Each of the graft copolymer products was recovered, compounded, molded and tested following procedures analogous to those employed in the third example. The composition of each of the graft copolymer products and their properties are set forth in the following tabulation:

TABLE III—PROPERTIES

| | | | | |
|---|---|---|---|---|
| Percent vinyl toluene in graft copolymer composition | 80 | 85 | 90 | 95 |
| Percent elastomeric preformed ethylene copolymer in graft copolymer composition | 20 | 15 | 10 | 5 |
| Tensile strength, pounds per square inch | 2,760 | 3,450 | 4,030 | 5,190 |
| Elongation, percent | 9.8 | 13.0 | 13.3 | 12.3 |
| Unnotched impact strength, inch-pounds | 2.4 | 2.8 | 1.3 | 2.0 |
| Heat distortion temperature, ° C. | 73 | 74 | 76 | 76 |

*Example 5*

A preformed elastomeric terpolymer of ethylene, vinyl acetate and the divinyl ether of diethylene glycol was prepared by the procedure of the third example using about 100 grams of the divinyl ether of diethylene glycol; 200 grams of vinyl acetate; 550 grams of benzene as a solvent; and 0.768 gram of tertiary butyl hydroperoxide as a catalyst. The preformed terpolymer had a solution viscosity of about 0.82 centipoise at 25° C. in a 0.5 percent solution in toluene. The vinyl acetate content of the terpolymer, by oxygen analysis, was about 28.9 percent. The content of the polymerized divinyl ether of diethylene glycol was about 2-4 percent, as determined within the approximate limits of detection by infra-red analysis. The partially crystalline elastomeric terpolymer thereby obtained could be cured by the application of heat to a tough and insoluble rubber-like mass, indicating the presence of units of the divinyl ether of diethylene glycol in the polymer. Solutions of the uncooled preformed ethylene terpolymer of 5 and 10 percent, respectively, in monomeric styrene were prepared and polmerized at 130° C. for 16 hours followed by additional polymerization at 150° C. for 6 hours. Another sample of 5 percent of the terpolymer in styrene was polymerized at 70° C. for 147 hours. The resulting products were devolatilized, compounded, molded and tested, following the procedure set forth in the first example. The results are set forth in the subsequent tabulation:

TABLE IV—PREPARATION DATA AND PROPERTIES

| | | | |
|---|---|---|---|
| Percent of ethylene terpolymer in graft copolymer composition | 5 | 10 | 5 |
| Polymerization temperature of graft copolymer | 130-150 | 130-150 | 70 |
| Tensile strength, pounds per square inch | 6,840 | 5,940 | 6,510 |
| Elongation, percent | 11.3 | 16.8 | 15.7 |
| Impact strength, inch-pounds | 1.8 | 2.4 | 3.2 |
| Heat distortion temperature, °C | 88 | 90 | 86 |

Test specimens of the samples polymerized at 130-150° C. were exposed for 100 and 200 hour periods, respectively, to intense ultraviolet light in an Atlas Fadeometer to determine the effect of such exposure on the mechanical properties of the graft copolymer compositions. The results are set forth in the following tabulation:

TABLE V—PROPERTIES UPON ULTRAVIOLET LIGHT EXPOSURE

| | | | |
|---|---|---|---|
| Percent ethylene terpolymer in graft copolymer composition | 5 | 5 | 10 |
| Hours in Fadeometer | 100 | 200 | 100 |
| Tensile strength, pounds per square inch | 7,160 | 7,220 | 6,350 |
| Elongation, percent | 12.3 | 10.7 | 18.1 |
| Impact Strength, inch-pounds | 1.7 | 1.8 | 1.8 |

*Example 6*

An elastomeric, semi-crystalline terpolymer melting at 63-71° C. was obtained following the general procedure of the third example by employing about 60 grams of benzene as a solvent, 20 grams of the divinyl ether of diethylene glycol, 20 grams of vinyl acetate and 0.120 gram of tertiary butyl hydroperoxide as the mass that was charged to the autoclave for the reaction with ethylene under the elevated pressures. The resulting terpolymer was found by analysis to contain about 77.69 percent carbon; 12.76 percent hydrogen and 9.56 percent oxygen (by difference). Upon infrared analysis, the presence of both vinyl ether and acetate groups was verified. The terpolymer contained about 71±3 percent of polymerized ethylene; 13±6 percent of polymerized vinyl acetate; and 16±7 percent of the polymerized divinyl ether of diethylene glycol. The viscosity of a 0.5 percent solution of the terpolymer in toluene at 25° C. was about 0.70 centipoise.

A 10 percent solution of the preformed elastomeric terpolymer in vinyl toluene was prepared and polymerized at 130° C. for 12 hours and 150° C. for 4 hours. After devolatilization, compounding with 0.85 percent n-butyl stearate and 0.5 percent stabilizer, molding and testing as in the third example, the resulting graft copolymer product had the following properties:

TABLE VI—PROPERTIES

| | |
|---|---|
| Tensile strength p.s.i. | 4800 |
| Elongation percent | 18.9 |
| Impact strength in.-lb. | 3.2 |
| Heat distortion temperature °C | 71 |

*Example 7*

An elastomeric terpolymer of about 74±2 percent of ethylene, 13±6 percent of the monovinyl ether of diethylene glycol and 13±6 percent of the divinyl ether of diethylene glycol was prepared by copolymerizing ethylene with the mono- and divinyl ethers of diethylene glycol following the procedure employed in the third example. As in the Example 3, the elastomeric terpolymer was then dissolved (as a preformed substrate) in monomeric styrene to obtain a solution containing about 5 percent solution of the terpolymer in the styrene, based on the weight of the resulting solution. The solution was polymerized by heating it in a closed container at 130° C. for about 12 hours followed by an additional period of heating for 4 hours at 150° C. The graft copolymeric product was recovered and devolatilized employing a procedure analogous to that set forth in the third example. Thereafter, the graft copolymeric product was heat plastified on compounding rolls and subsequently milled at temperatures between about 150 and 160° C. for a period of 6 minutes while incorporating about 0.5 percent of 2,6-ditertiary-butyl-4-methyl phenol as a stabilizer and 0.85 percent of n-butyl stearate as a plasticizer therein. After being removed from the rolls, the resulting compounded graft copolymer product was allowed to cool before being comminuted. Molded test bars of the composition were prepared and tested by the procedure set forth in the third example. The graft copolymer product had the following properties:

TABLE VII—PROPERTIES

| | |
|---|---|
| Tensile strength p.s.i. | 6130 |
| Elongation percent | 9.8 |
| Unnotched impact strength in.-lb. | 3.0 |
| Heat distortion temperature °C | 84 |

In addition, several test bars of the compounded composition were tested after being aged by exposure to ultraviolet light in an Atlas Fadeometer for 100 hours. After this period of exposure, the composition had a tensile strength of 6250 pounds per square inch; an elongation of 11.7 percent; and an unnotched impact strength of 2.1 inch-pounds. As is apparent, the graft copolymer composition employing the preformed copolymer backbone substrate of the present invention had excellent aging characteristics.

*Example 8*

In each of two experiments, about 10 grams of a copolymer of about 79.4 percent of ethylene and 20.6 percent of the monovinyl ether of diethylene glycol was dissolved in 90 grams of a different alkenyl aromatic monomer. In the first experiment, monomeric styrene was employed for dissolving the copolymer. In the second, monomeric vinyl toluene was utilized. The preformed elastomeric copolymer was prepared by a procedure similar to that described in Example 3. Its viscosity in a 0.5 percent solution in toluene at 90° C. was 0.31 centipoise. Each of the graft copolymer compositions was polymerized by heating the dissolved mixtures of the preformed copolymer in the monomer in a closed container at a temperature of 130° C. for an initial 12 hour period followed by heating at 150° C. for an additional 4 hours. The polymer products were recovered, devolatilized, molded and tested, employing procedures similar to those set forth in the third example. Each of the products had properties as set forth in the following tabulation:

TABLE VIII—PROPERTIES

| | Graft Copolymer of 90 percent Styrene and 10 percent Preformed Ethylene Polymer | Graft Copolymer of 90 percent Vinyl Toluene and 10 percent Preformed Ethylene Polymer |
|---|---|---|
| Tensile strength, pounds per square inch | 3,820 | 4,110 |
| Elongation, percent | 23.0 | 18.9 |
| Unnotched impact strength, inch-pounds | 1.6 | 1.4 |
| Heat distortion temperature, °C | 80 | 70 |

*Example 9*

Following the general procedure of Example 3, an elastomeric ethylene terpolymer in accordance with the present invention was prepared from the following recipe, which was pressured under ethylene to prepare the polymer product:

| | Grams |
|---|---|
| Monovinyl ether of diethylene glycol | 400 |
| Divinyl ether of diethylene glycol | 200 |
| Tert-butyl hydroperoxide | 1.0 |
| Benzene | 200 |

About 405 grams of terpolymer product was obtained containing, by analysis, ethylene polymerized with about 35±3 percent, based on total copolymer weight, of a copolymerized mixture of the mono- and divinyl ethers of diethylene glycol consisting of 22±5 percent copolymerized monovinyl ether and 13±5 percent copolymerized divinyl ether. The solution viscosity of the terpolymer, dissolved in toluene at a concentration of 0.5 gram per 100 ml. of solvent, was about 0.68 centipoise at 25° C. and 0.41 centipoise at 90° C.

The soluble terpolymer product was vulcanized (i.e., cross-linked to an insoluble gel) by exposure for 1 hour to heat at 200° C.

*Example 10*

An ethylene terpolymer similar to that obtained in Example 5 was cured 1 hour by subjecting it to heat at 200° C. for the indicated time. The cured product was a relatively hard and insoluble rubber-like substance.

*Example 11*

The general procedure of Example 3 was again repeated excepting to omit the solvent in the reaction mass and to press the ethylene into a simple mixture of about 800 grams of undiluted monovinyl ether of diethylene glycol and 0.768 gram of tert.-butyl hydroperoxide. About 322 grams of a copolymer product was obtained consisting of about 57.5 percent of copolymerized ethylene and 42.5 percent of the copolymerized monovinyl ether. Its solution viscosity at 90° C., dissolved at a concentration of 0.5 gram of copolymer per 100 ml. solvent, was 0.39 centipoise.

The copolymer cured to a friable, insoluble "rubber" when exposed for 1 hour to heat at 200° C.

*Example 12*

The general procedure of Example 3 was again repeated with the following charge for pressurization under ethylene:

| | Grams |
|---|---|
| Monovinyl ether of diethylene glycol | 100 |
| Vinyl acetate | 400 |
| Tert.-butyl hydroperoxide | 0.768 |
| Benzene | 300 |

About 657 grams of copolymer product was obtained. Its solution viscosity (0.5 gram/100 ml. toluene) at 25° C. was 0.71 centipoise. It consisted of ethylene copolymerized with 42±1 percent of a copolymerized mixture of the monovinyl ether of diethylene glycol and vinyl acetate containing 10±5 percent of the copolymerized monovinyl ether and 32±5 percent of the copolymerized vinyl acetate.

The elastomeric terpolymer product cured in 1 hour at 200° C. to a "snappy" rubber material.

*Example 13*

The elastomeric terpolymer of Example 5 was compression molded at 65° C. to a standard test specimen and subsequently exposed for 150 hours to intense ultraviolet light radiation in an Atlas Fadeometer. After termination of the exposure, the product was insoluble in benzene.

Excellent cross-linking results are also obtained using high energy beta or gamma radiation or Friedel-Crafts catalysts as cross-linking agents.

By way of contrast with the foregoing, a 60 percent ethylene/40 percent vinyl acetate copolymer required more than 15 hours of exposure to heat at 200° C. before any evidence of cross-linking was apparent. A 77 percent ethylene/23 percent vinyl acetate copolymer compression molded at 65° C. and subsequently exposed for 150 hours in the Atlas Fadeometer remained entirely soluble in benzene.

Results analogous to and commensurate with those demonstrated in the foregoing examples of the compositions in accordance with the present invention may be obtained when the elastomeric ethylene copolymers are prepared with other polyol vinyl ethers indicated to be within the scope of the invention or when the ethylene copolymers are made with mixtures of glycol (or other polyol) vinyl ethers and any of the other supplemental vinyl ester or ether monomers within the herein described purview of the present contribution to the art.

What is claimed is:

1. Copolymer consisting, in polymerized form, of: (1) between about 50 and about 99 percent by weight, based on the weight of the copolymer, of ethylene and (2) between about 50 and about 1 percent by weight, based on the weight of the copolymer, of a polyol vinyl ether selected from the group consisting of (a) a monovinyl ether of a polyalkylene polyol containing from 4 to about 10 carbon atoms and (b) a polyvinyl ether containing from 2 to 3 vinyl oxy substituents on an aliphatic polyol of from 2 to about 10 carbon atoms.

2. The copolymer of claim 1 containing in polymerized form between about 70 and 90 percent by weight of ethylene.

3. The copolymer of claim 1, wherein said polyol vinyl ether is the divinyl ether of diethylene glycol.

4. The copolymer of claim 1, wherein said polyol vinyl ether is the monovinyl ether of diethylene glycol.

5. Copolymer consisting, in polymerized form, of: (1) between about 50 and about 99 percent by weight, based on the weight of the copolymer of ethylene; and (2) between about 50 and about 1 percent by weight, based on the weight of the copolymer, of a mixture of (a) from about 95 to about 10 mole percent, based on the constitution of the mixture, of a polyol vinyl ether selected from the group consisting of a monovinyl ether of a polyalkylene polyol containing from 4 to about 10 carbon atoms, and a polyvinyl ether containing from 2 to 3 vinyl oxy substituents on an aliphatic polyol of from 2 to about 10 carbon atoms and (b) from about 5 to about 90 mole percent, based on the constitution of the mixture, of a supplemental comonomer selected from the group consisting of monovinyl ethers of monocarboxylic aliphatic acids, monovinyl ethers of monohydric aliphatic alcohols, monovinyl esters of monocarboxylic aliphatic acids, monovinyl esters of monohydric aliphatic alcohols and mixtures thereof, said acids and said alcohols having from 1 to about 8 carbon atoms.

6. The copolymer of claim 5 containing in polymerized form between about 70 and about 90 percent by weight of ethylene, and wherein the mole percentage of said supplemental monovinyl comonomer is between about 25 and 75 mole percent, based on the constitution of said mixture with the polyol vinyl ether.

7. The copolymer of claim 5, wherein said polyol vinyl ether is the divinyl ether of diethylene glycol.

8. The copolymer of claim 5, wherein said polyol vinyl ether is the monovinyl ether of diethylene glycol.

9. A high molecular weight normally-solid copolymer of ethylene and diethylene glycol monovinyl ether in which polymerizate of the said ether constitutes about 1% to 20% by weight of the polymer.

10. Normally solid copolymer of ethylene and diethylene glycol monovinyl ether characterized by a hydrocarbon chain substituted at intervals by

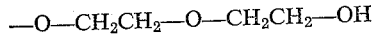

units and said ether constitutes 2 to 20% by weight of the polymer.

11. Method of preparing uncrosslinked, elastomeric ethylene copolymers which comprises subjecting a quantity of a monomer mass comprised of a polyol vinyl ether selected from the group consisting of (a) a monovinyl ether of a polyalkylene polyol containing from 4 to about 10 carbon atoms and (b) a polyvinyl ether containing from 2 to 3 vinyl oxy substituents on an aliphatic polyol of from 2 to about 10 carbon atoms to contact with ethylene, under a pressure between about 5000 and about 40,000 pounds per square inch at a temperature between about 60 and 230° C., in an amount proportioned relative to the quantity of said polyol vinyl ether to provide upon copolymerization between about 50 and about 99 percent by weight, based on the weight of the resulting copolymer, of ethylene in polymerized form in the resulting copolymer, said polyol vinyl ether being subjected to said ethylene in the presence of a peroxide catalyst; then, copolymerizing said polyol vinyl ether with said ethylene at said temperature and under said pressure until not more than about 90 percent by weight of the originally present quantity of said polyol vinyl ether has reacted with said ethylene.

12. The method of claim 11, wherein said polyol vinyl ether is copolymerized with said ethylene until between about 25 and 75 percent by weight of the originally present quantity of said polyol vinyl ether has been reacted with said ethylene.

13. The method of claim 11, wherein the amount of said ethylene is proportioned to provide, upon copolymerization, between about 70 and 90 weight percent of ethylene in polymerized form in the resulting copolymer.

14. The method of claim 11, wherein said monomer mass contains, in addition to said polyol vinyl ether, an aromatic solvent of the benzene series for said polyol vinyl ether and wherein said temperature is between about 120° C. and 135° C.

15. The method of claim 14, wherein said solvent is benzene.

16. The method of claim 11, wherein said polyol vinyl ether is the divinyl ether of diethylene glycol.

17. The method of claim 11, wherein said monomeric mass contains, in addition to said polyol vinyl ether, between about 5 and 90 mole percent of a copolymerizable supplemental comonomer selected from the group consisting of monovinyl ethers of monocarboxylic aliphatic acids, monovinyl ethers of monohydric aliphatic alcohols, monovinyl esters of monocarboxylic aliphatic acids, monovinyl esters of monohydric aliphatic alcohols and mixtures thereof, said acids and said alcohols having from 1 to about 8 carbon atoms.

18. The method of claim 17, wherein between about 25 and 75 mole percent of said copolymerizable supplemental comonomer is contained in said monomer mass.

19. The method of claim 17, wherein said polyol vinyl ether is a vinyl ether of diethylene glycol and said supplemental comonomer is vinyl acetate.

20. The method of preparing a high molecular weight interpolymer which comprises copolymerizing diethylene glycol monovinyl ether and ethylene at temperatures from 100° to 200° C. and pressures of about 15,000 to 40,000 p.s.i. in the presence of a free-radical initiating ethylene polymerization catalyst, the monomers being provided in amounts such that the diethylene glycol monovinyl ether constitutes 2 to 20% by weight of the total monomer charge.

21. The method of claim 20 in which a peroxide catalyst is employed.

References Cited by the Examiner

UNITED STATES PATENTS 2,621,169 12/1952 Robinette et al. _____ 260—91.1
2,839,514 6/1958 Shokal et al. _____ 260—80.5
2,949,474 8/1960 Murdock.
3,025,267 3/1962 Calfee.
3,025,268 3/1962 Deex et al.

JOSEPH L. SCHOFER, *Primary Examiner.*

M. LIEBMAN, P. E. MANGAN, M. STERMAN, H. BRUSTEIN, R. J. BUTTERMARK, W. HOOVER, E. J. SMITH, L. Q. QUAST, *Assistant Examiners.*